United States Patent [19]
Dutchburn

[11] 3,960,067
[45] June 1, 1976

[54] COUNTERBALANCE FOR ROTARY SPIT

[75] Inventor: Leslie G. Dutchburn, Toronto, Canada

[73] Assignee: Develpro Incorporated, Toronto, Canada

[22] Filed: Mar. 19, 1975

[21] Appl. No.: 559,958

[52] U.S. Cl. .............................. 99/421 H; 74/573 R
[51] Int. Cl.² ......................................... A47J 37/04
[58] Field of Search ............. 99/419, 420, 421, 346; 73/469, 573

[56] References Cited
UNITED STATES PATENTS

| | | | |
|---|---|---|---|
| 1,361,183 | 12/1920 | Reed | 99/421 H UX |
| 3,143,003 | 8/1964 | Schmitt | 99/421 H X |
| 3,298,247 | 1/1967 | Juno | 99/419 X |
| 3,502,019 | 3/1970 | Koons, Jr. | 99/421 R |
| 3,630,139 | 12/1971 | Wehrle | 99/421 H |
| 3,720,157 | 3/1973 | Van Bergen | 99/421 H |

Primary Examiner—Leonard D. Christian
Assistant Examiner—Arthur O. Henderson
Attorney, Agent, or Firm—David W. Wong

[57] ABSTRACT

A fully detachable counterbalance device for use in a rotisserie unit is shown herein. The device is fully adjustable to provide weight balance on both sides of the spit such that the spit can be rotated in a uniform motion. The device comprises a yoke member having a U-shaped cross section and comprising two substantially parallel spaced leg portions and a web portion. Two openings are formed in an aligned manner in the leg portions. The distance from each of the openings to the web portion is slightly larger than the width of the spit so that the yoke member is slidably and transversely engageable on the spit in a straddle manner. A weighted short rod member is slidably extensible through the openings after the yoke member is positioned on the spit so that the spit is slidably bound by the yoke member and a portion of the rod. The rod and the yoke member are mounted fixedly on the spit by operating a set screw provided at the web portion of the yoke member. A main counterbalance weight is slidably mounted on the rod.

5 Claims, 7 Drawing Figures

COUNTERBALANCE FOR ROTARY SPIT

BACKGROUND OF THE INVENTION

This invention relates to a counterbalance device, and particularly relates to a fully adjustable counterbalance device which can be selectively slidably mounted on a rotatable spit of a rotisserie.

Rotisseries are commonly used for cooking an object such as a roast over or in a barbecue pit, or a barbecue grill, or an oven, or a fireplace. In U.S. Pat. No. 3,730,467 issued on May 1, 1973 to Leslie G. Dutchburn and entitled "MEANS FOR REMOVABLE ATTACHMENT OF A LOAD SUPPORTING ASSEMBLY TO A SURFACE", a rotisserie is shown for cooking an object in a fireplace.

In using a rotisserie, it is essential to mount the object properly on the spit of the rotisserie such that the weight of the object is distributed radially evenly about the spit. An uneven weight distribution would cause the spit to rotate in an eccentric erratic fashion. This is due to that the object would have a heavier portion on one side of the spit than a lesser portion on the opposite side of the spit, so that in half of its rotating cycle the spit is lugging or raising the heavier portion of the object such that its speed is slower, and in the other half cycle the heavier portion of the object is exerting a downward pivotal force on the spit such that its speed becomes accelerated. The erratic rotation would cause the object to cook unevenly and would sometimes even cause damage to the rotisserie. Since it is quite difficult to mount the object properly in an even fashion on the spit, such undesirable imbalance problem always exists in using a rotisserie.

It is well known that the imbalance condition of the rotisserie can be compensated by mounting a counterbalance on the spit. Commonly, the counterbalance consists of a collar having a rod mounted perpendicularly thereon. The collar is secured on the spit such that the rod extends transversely outwards from one side of the spit. A weight is mounted on the rod. When the object is mounted on the spit, the collar is rotated until the rod is extending outwardly opposite to the heavier portion of the object. The weight is then adjusted until a weight balanced condition is obtained on both sides of the spit.

The main drawback of known counterbalance devices is that they provide counterbalance to only one side of the spit such that sometimes it is difficult to attain a perfectly balanced condition. In order to meet all counterbalance requirements, the user must carry different sizes of weights and must change the weights to achieve the desirable balanced condition. The weights are subject to loss and are difficult to be adjusted. Furthermore, it is dificult to mount such counterbalance device on the spit since the collar must be fitted onto the spit by dismounting the latter from the support assembly of the rotisserie. This operation is difficult and sometimes impossible when the object is already mounted on the spit.

PURPOSE OF THE INVENTION

It is a principal object of the present invention to provide a counterbalance device which is fully adjustable to provide counterbalance to both sides of the spit.

It is an object of the present invention to provide a counterbalance device which is easily securable on the spit and is fully detachable therefrom without having to remove the spit from the mounted operating position even when the object is mounted on the spit.

It is another object of the present invention to provide a counterbalance device which provides a counterbalance directly opposite to the imbalance heavier weight of a load on one side of the spit.

It is yet another object of the present invention to provide a counterbalance device which is simple in structure and has only a few component parts.

BRIEF DESCRIPTION OF DRAWINGS

Other objects of this invention will appear in the following description and appended claims, reference being made to the accompanying drawings forming a part of the specification wherein like reference characters designate corresponding parts in the several views:

DESCRIPTION OF SPECIFIC EMBODIMENT

Figure 1:
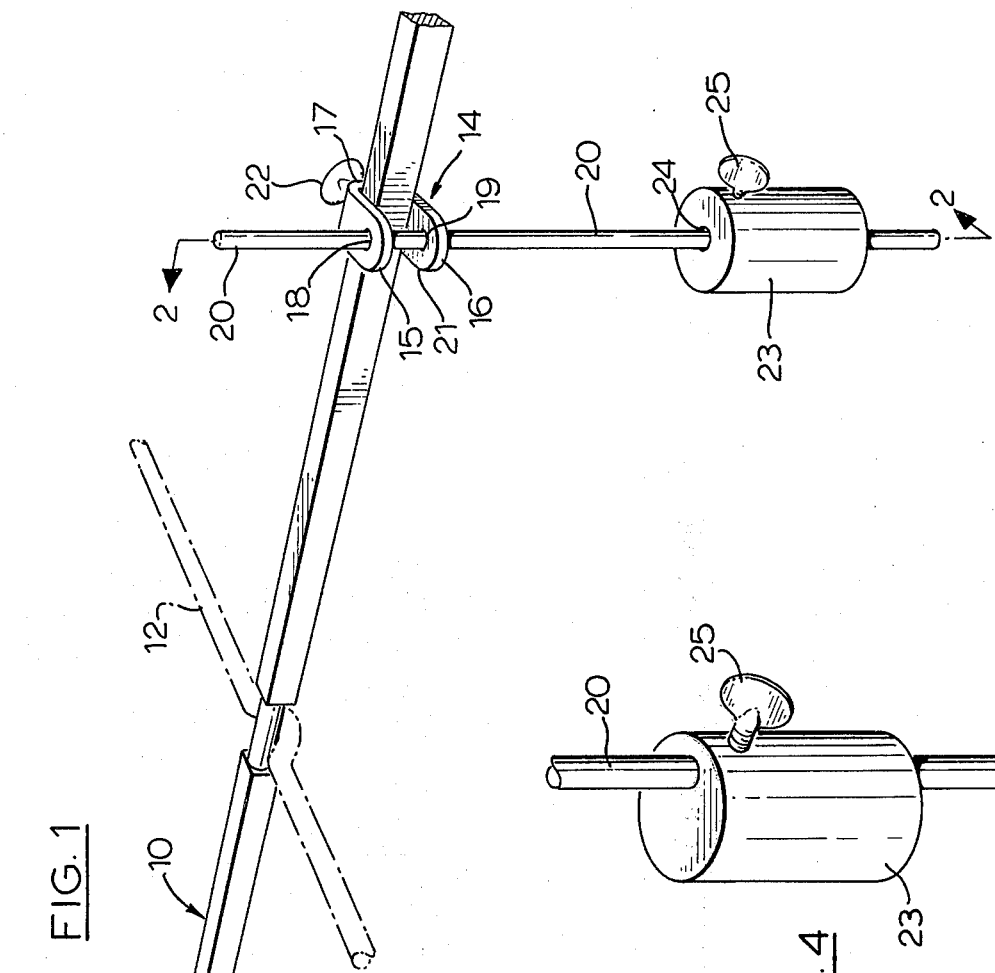
FIG. 1 is a perspective view showing the counterbalance device according to the present invention mounted on a spit of a rotisserie assembly.

Referring now to the drawings, a rotisserie unit 10 is generally partially shown having a spit 11 journalled on a supporting bracket 12. Prongs 13 are provided on the spit for securing an object such as a roast or other meat thereon for cooking purposes. The spit 11 is usually rotated by a motor (not shown) coupled to one end therein.

The counterbalance device of the present invention comprises a yoke member 14 which is substantially U-shaped in cross section and has two spaced opposed legs 15 and 16 and a web portion 17. Two openings 18 and 19 are formed in the legs 15 and 16 respectively. The openings 18 and 19 are aligned with each other, and the distance between each opening 18 or 19 to the web portion 17 is larger than the width or cross sectional diameter of the spit 11 so that when the yoke member is slidably mounted on the spit in a straddle manner as shown in the drawings, the openings 18 and 19 are not blocked by the spit. A short rod 20 is slidably extended through the openings 18 and 19 such that the spit is slidably surrounded by the yoke member and a portion 21 of the short rod extending between the legs 18 and 19 of the yoke member. A set screw 22 is provided at the web portion of the yoke. The set screw 22 may be tightened to cause the portion 21 of the short rod 20 to clamp tightly against the spit. This single clamping action not only secures the yoke and the short rod on the spit but also releasably prevents the short rod from sliding movements. In order to slide the yoke along the spit and/or to slide the short rod transversely more to one side or the other with respect of the spit, it is only required to loosen the single set screw 22. The yoke and the rod may be fully dismounted from the spit by loosening the set screw 22 and sliding the rod outside of the yoke and then removing the yoke from the spit. In this manner, the yoke and the short rod may be mounted or dismounted from the spit quickly and easily without having to remove the spit from the rotisserie assembly.

A main counterbalance weight 23 is slidably mounted on a selected side of the short rod 20. The main counterbalance weight 23 may be in the form of a heavy cylinder which has a longitudinal center bore 24. The weight is releasably secured on the short rod by a set screw 25 which is formed close to one end of the cylinder such that the cylinder can be mounted outward as far as possible at the end of the short rod if necessary.

The short rod 20 preferably should have a total weight equal to or slightly heavier than the main counterbalance weight 23 so that it can be slidably adjusted to have selected lengths on both sides of the spit to provide finer or additional counterbalance weight. When the rod is extended entirely to one side of the spit and the cylindrical weight mounted immediate the free end of the longer side of the rod; a total counterbalance weight of about double the weight of the cylinder can be provided on one side of the spit. When the short rod is extended as much as possible to the other side, i.e. the same side as the heavier side of the meat, the cylindrical main counterbalance weight will be mounted on the short side of the rod and will be abutting the leg 15 of the yoke. In this configuration, the main counterbalance weight will provide only a slight counterbalance opposite to the heavier side of the meat with respect to the spit. Therefore, by varying the lengths of the short rod on both sides of the spit and the position of the cylindrical main counterbalance weight, various desirable counterbalance conditions can be achieved.

In use, the meat is mounted on the spit in the common manner by inserting it as close as possible through the center of gravity of the meat. The prongs 13 are then inserted into the sides of the meat to secure it fixedly on the spit. The spit is then mounted securely and rotatably on the rotisserie support. Normally, due to the uneven distribution of the weight of the meat with respect to the spit; the spit will rotate and come to rest with the heavier side of the meat hanging on the lower side of the spit. The yoke member 14 is transversely and slidably placed sideways in a straddle manner on a selected position along the length of the spit. The position should be selected such that the short rod will not strike any obstacle in its rotation and preferably it should be mounted in the portion of the spit outside of the flame in order that it is convenient to re-adjust the counterbalance device, if necessary, during the cooking operation. The short rod 20 is then slidably inserted through the openings 18 and 19 with the major portion of the rod extending upwards opposite to the heavier side of the meat with respect to the spit. The set screw 22 is lightly tightened until there is just sufficient clamp force to retain the yoke and the rod fixedly in place on the spit.

Commonly, the spit may not rest with its side surface positioned in a vertical manner. Thus, when the short rod is first mounted on the spit, it may extend obliquely with respect to the vertical line through the center of gravity of the meat. If the main counterbalance weight is mounted on the upper end of the short rod which is in this oblique position, the main counterbalance weight will not be directly opposite to the heavier side of the meat. To compensate for such condition, the length of the short rod on both sides of the spit is adjusted until the spit is rotated to rest with the short rod positioned as close to vertical as possible. Thus, the short rod will be parallel or coincident with the vertical line passing through the center of gravity of the meat. With the short rod disposed in such vertical manner the main counterbalance weight can be slidably mounted on the upper end of the short rod and its position can be adjusted until it counterbalances the heavier weight of the meat. When a balanced condition is achieved, the spit can be rotated with an even motion and it can be stopped to rest in any selected position in its rotation. Numerous combinations of adjusting the short rod and the main counterbalance weight may be made to provide selected configurations and appropriate balanced weight distribution about the spit.

Sometimes, due to the loss of fat and/or fluid matters in the meat during cooking, its center of gravity may change slightly. The counterbalance device may be easily and quickly re-adjusted to compensate for such change of weight distribution without having to remove the spit from the rotisserie support.

Figure 4:
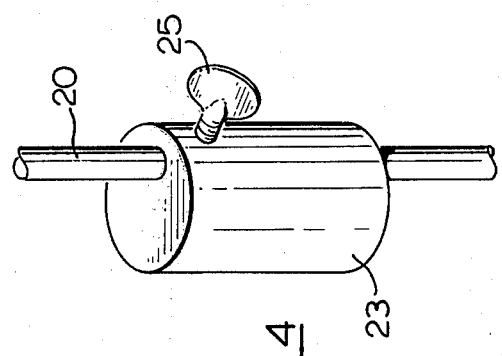
FIG. 4 is a perspective view showing the adjustability of the main weight.
Figure 2:
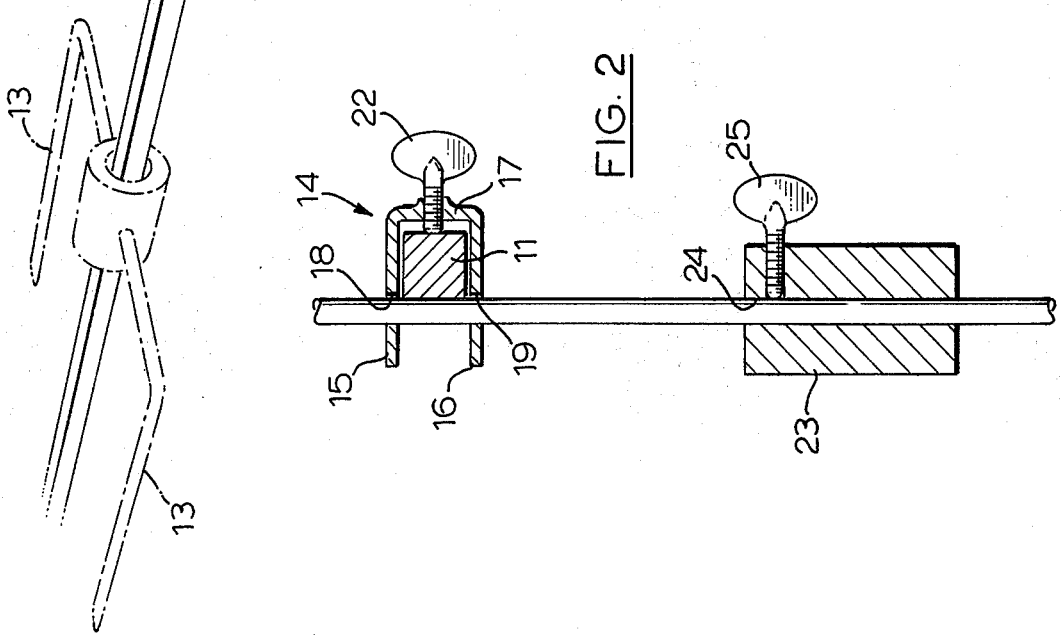
FIG. 2 is a sectional side view of the counterbalance device according to the present invention taken along section line 2—2 of FIG. 1.

FIG. 4 shows a main counterbalance weight 23 having its longitudinal bore 24 offset towards one side of the cylinder. With such structure, the main counterbalance weight may be rotated about the short rod to vary its center of gravity with respect to the short rod such that the center of gravity of the main counterbalance weight may be varied to a position closer to and directly opposite to the center of gravity of the meat. Thus, this structure provides additional finer adjustment for achieving a perfectly balanced condition of weight distribution about the spit.

FIGS. 3a to 3d show a second embodiment of the counterbalance device according to the present invention. In this embodiment, the yoke member 14 has a shorter leg 15 and a longer leg 16. A short portion of the longer leg adjacent the web portion 17 in combination with the shorter leg 15 and the web portion 17 forms a brace portion of the yoke member for embracing the spit 11. A second set screw 28 is provided in the short portion for varying the width of the brace portion for receiving spits of different cross sectional sizes. Typically, the brace portion is about ½ inch square in dimension such that it can accommodate spits which are commonly about ¼ to ⅜ inch in cross sectional dimension and they may have a square, hexagonal or circular cross sectional shape.

The longer leg 16 includes an L-shaped step portion such that the remaining free end portion therein forms an expanded portion of the yoke member. The gap between the legs 15 and 16 in the expanded portion is wider than the width of the brace portion. The reason for such structure will become apparent in the description hereafter.

The opening 18 in the shorter leg 15 has an elongated shape and two additional elongated openings 26 and 27 are formed in the longer leg 16 as shown. The outer opening 27 is more elongated than the middle opening 26.

Figure 3A:
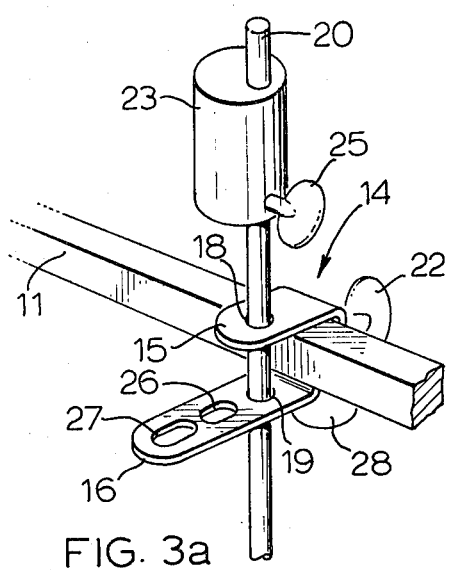
FIG. 3a is a perspective view of a second embodiment of the present invention having means for mounting the counterbalance diametrically opposite to the heavier side of the meat.
Figure 3B:
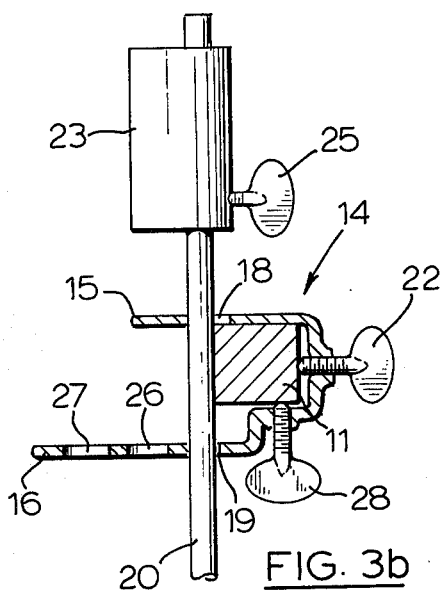
FIGS. 3b, 3c and 3d are partial sectional side views of the embodiment shown in FIG. 3a showing methods of mounting the counterbalance device to the spit in various positions.

As shown in FIG. 3b, when the spit is initially resting with its side surface in the vertical manner or substantially in the vertical manner, the yoke member, when mounted on the spit, will be in the horizontal position. In this condition, the short rod 11 can be slidably mounted through openings 18 and 19 to position in a vertical manner. Thus, when the main counterbalance weight 23 is mounted on the upper end of the short rod the weight 23 will be positioned directly opposite to the heavier side of the meat and weight 23 can be easily adjusted to provide a perfectly balanced condition.

Figure 3C:
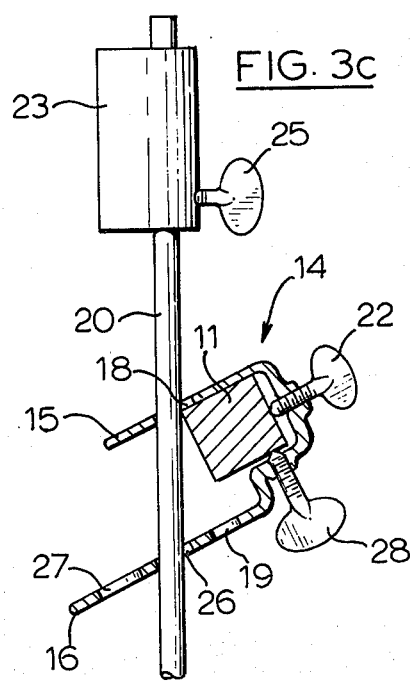

As shown in FIG. 3c, when the spit is initially resting with its side surface about 25 degrees from the vertical or substantially in this position, the yoke member, when mounted on the spit, will be inclined from the horizontal position for the same degree. In this condition, the short rod 11 can be slidably mounted through openings 18 and 26 such that the short rod will be positioned in the vertical position without having to initially adjust the lengths of the short rod to bring the side surface of the spit back to the vertical position. This allows the short rod to be more freely adjusted in more various positions to provide a balanced condition. The yoke member may be mounted either from the left side or right side of the spit depending on the resting position of the spit so that the short rod when slidably mounted through openings 18 and 26 will be in the vertical position.

Figure 3D:
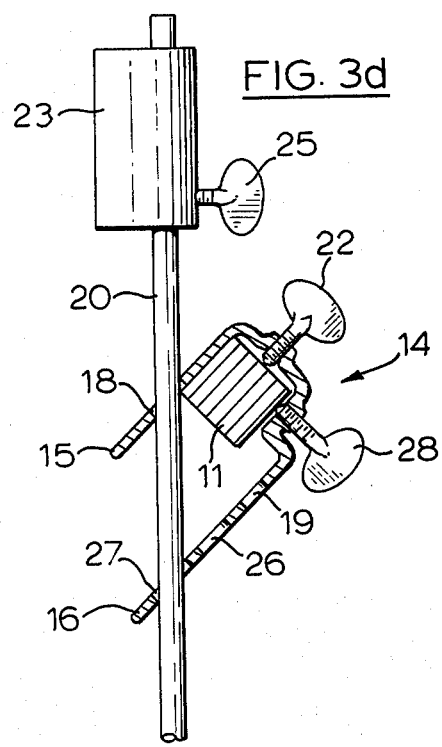

FIG. 3d shows the condition in which the spit is resting with its side surface skewed at about 45 degrees from the vertical. In this condition, the short rod can be slidably mounted through openings 18 and 27 such that it is positioned in the vertical manner.

The wider gap in the expanded portion of the yoke member allows the openings 19, 26 and 27 to be spaced apart from one another. Also, more openings may be provided on the longer leg 16 to enable the short rod to be mounted in the vertical manner for all initial resting positions of the spit; however, normally three openings as shown will suffice since the short rod may be adjusted initially to turn the spit until the rod is positioned in the vertical position before mounting the main counterbalance weight thereon.

While the invention has been particularly shown and described with reference to preferred embodiments thereof, it will be understood by those skilled in the art that various changes in form and detail may be made therein without departing from the spirit and scope of the invention.

What I claim as new and desire to protect by Letters Patent of the United States is:

1. An adjustable counterbalance device for a rotatable spit of a rotisserie assembly, comprising a yoke member having a substantially U-shaped cross section including a shorter leg, a longer leg and an integral transverse web, said shorter leg and said longer leg being spaced from and substantially parallel to each other, said yoke member having a U-shaped brace portion formed by a short portion of said shorter leg and longer leg immediate said web, said yoke member being slidably and transversely securable in a straddle manner on said spit with said spit received in said brace portion, a first opening formed in said shorter leg, a second, third and fourth opening formed in said longer leg, a rod member securable on said yoke member selectively in a first, second and third position, whereby in said first position said rod member extends through said first opening and said second opening and is substantially perpendicular to said shorter leg; and in said second position said rod member extends through said first opening and said third opening and is skewed at substantially 65 degrees from said shorter leg; and in said third position said rod member extends through said first opening and said fourth opening and is skewed at substantially 45 degrees from said shorter leg, an adjustable set screw provided at said web, said set screw being operative to cause said rod member and said yoke member to clamp securely on said spit, and a weight member slidably secured on said rod member, said weight member being adjustable to position at a selected position along the length of said rod member.

2. An adjustable counterbalance device according to claim 1, wherein said weight member is a cylindrical member having a longitudinal bore offset from the longitudinal central axis therein, said rod member being slidably engaged in said longitudinal bore, and said weight member has a locking set screw provided on its side and positioned adjacent to one end therein, said locking set screw being operative for securing said weight member fixedly at said selected position along the length of said rod member.

3. An adjustable counterbalance device according to claim 2, wherein said longer leg includes an L-shaped step portion whereby the distance between the free end portion of said longer leg and the free end portion of said shorter leg is larger than the width of said brace portion of said yoke member.

4. An adjustable counterbalance device according to claim 3, including an adjustment means provided at said brace portion operative for varying the width of said brace portion.

5. An adjustable counterbalance device according to claim 4, wherein said adjustment means is a set screw provided in said short portion of said longer leg.

* * * * *